Figure 1:
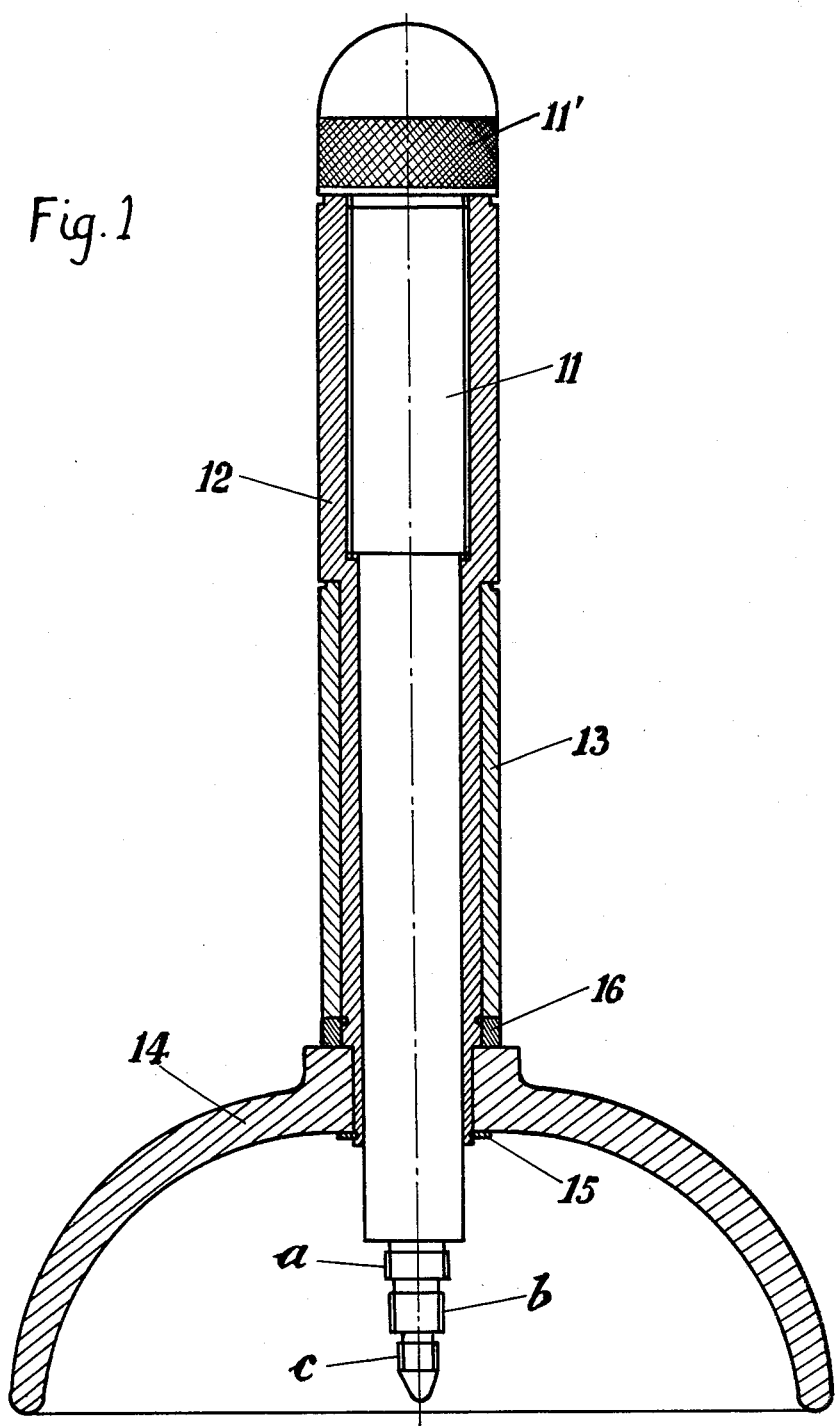

Nov. 13, 1962 V. DUQUESNE 3,063,484
AXIALLY EXTENDING TOOL MOUNTING COLUMN FOR DISC WHEELS
Filed Aug. 18, 1959

INVENTOR:
VICTOR DUQUESNE
PER Linton and Linton
ATTORNEYS

3,063,484
Patented Nov. 13, 1962

3,063,484
AXIALLY EXTENDING TOOL MOUNTING COLUMN FOR DISC WHEELS
Victor Duquesne, 42–44 Rue Quellin, Antwerp, Belgium
Filed Aug. 18, 1959, Ser. No. 834,442
Claims priority, application Belgium Aug. 20, 1958
1 Claim. (Cl. 144—288)

The present invention relates to apparatus used for mounting and removing tires of motor vehicle wheels, and particularly for supporting tools for removing and mounting tires.

In such known apparatus, the wheel body is centered and locked upon a supporting plate, which bears a shaft of convenient section adapted to traverse the central opening of appreciable diameter of the wheel disc. This shaft resists the considerable forces from tools operating upon the tire. Applicant is owner of patents relating to such apparatus, namely United States Patent No. 2,845,969 and Patent No. 2,916,065.

Some automobile works, such as those manufacturing the cars of the trademarks "Citroën," "Peugeot," "Fiat," "Renault," "D.A.F.," omit the central opening of large diameter in the wheel discs and provide in such discs only a central perforation of small diameter, generally tapped and among such wheels some have their disc provided in the center with a narrow bridge piece which presents such a small tapped perforation. Said very small perforations prevent the passage of a shaft sufficiently strong to resist the forces of the tools used for mounting or removing the tires. Other types of disc wheels have a plain center without any central perforation and present only a number of holes arranged equidistant around the center of the wheel disc. The construction of this type of wheels also prevents the central passage of a shaft of a sufficient diameter.

The omission of a central opening of sufficient diameter in the disc of such wheels does not permit the erection of a sufficiently strong shaft upon the supporting plate upon which is generally locked the wheel to be worked upon.

It is however indispensable to provide a central shaft of sufficient solidity to resist the forces of tools used for mounting or removing tires.

A form of embodiment of the object of the invention will be described by way of example with reference to the accompanying drawing.

FIGURE 1 is a longitudinal sectional view of a device according to the present invention comprising a shaft and a bell-shaped member, which can be rigidly mounted upon the wheel disc at the central tapped perforation of the disc, the wheel being eventually centered and locked upon the supporting plate by known means acting upon the wheel rim.

The device of the FIGURE 1 is more specially intended for wheels having a disc provided with a small central tapped hole.

A shaft 11 having a milled head 11′ is prolonged by an axial extension having three different standardized threaded portions *a, b, c,* adapted to screw into the corresponding tapped perforations mentioned herebefore and which are also standardized for the wheels of cars presently in the trade. With wheels having a central narrow bridge member upon the disc provided with a smooth perforation the shaft 11 may be anchored by means of a nut screwing upon the lower end of the extension traversing said perforation.

Said shaft 11 extends through and is in threaded engagement with a milled sleeve 12, of which the lower end holds the contact bell 14 which is retained thereon between the washer 15 and an annulus 16 both keyed upon said sleeve. A freely rotatable sleeve 13 surrounds the sleeve 12 between a shouldering of the latter and said annulus 16.

It is useful to make the circular edge of the bells of the largest possible diameter with relation to the conformation of the wheel disc, in view of forming an extended triangulation between the shaft and the bell edge. Such arrangement ensures a perfect stability of the shaft while the freely rotatable sleeve will support the tools operating upon the tires. Furthermore the tractive strain imparted to the threads is reduced to the minimum.

In use the device according to the invention is easily and quickly located. The shaft 11 is rotated by using the milled head 11′ so that one of the threads *a, b, c,* engages into the corresponding perforation of the wheel disc. The sleeve 12 is then rotated upon the shaft 11 moving the bell 14 into contact with the wheel disc under sufficient pressure. There results therefrom the erection of the shaft 11 and its stabilisation on the axis of the wheel body.

I claim:

An axially extending tool mounting column for disc wheels, of which the disc has a central tapped hole of small diameter, comprising a shaft the diameter of which is larger than that of said tapped hole, a milled head at one end of said shaft, at least one threaded extension at the opposite end of said shaft adapted to be screwed into said tapped hole, a sleeve in threaded engagement with said shaft adjacent said milled head and in abutting relation thereto, a bell-shaped member on said shaft adjacent said threaded extension thereof with the convex side of the bell-shaped member facing said milled head, said bell-shaped member having a circular edge in a plane at right angles to the axis of said shaft, said sleeve having a reduced portion extending along with said shaft through the top of said bell, an annulus keyed to said sleeve outside and bell, a washer keyed to said reduced portion within said bell for locking said bell between said washer and said annulus.

References Cited in the file of this patent

UNITED STATES PATENTS

| 1,752,759 | Smith | Apr. 1, 1930 |
| 2,034,819 | Maulis | Mar. 24, 1936 |
| 2,845,969 | Duquesne | Aug. 5, 1958 |

FOREIGN PATENTS

| 705,773 | Great Britain | Mar. 17, 1954 |